F. P. BURDGE.
CULTIVATING IMPLEMENT.
APPLICATION FILED JAN. 25, 1909.

956,477.

Patented Apr. 26, 1910.
2 SHEETS—SHEET 1.

WITNESSES:
Clinton D. Murray
John M. Regan

INVENTOR
FRANKLIN P. BURDGE,
BY
Thomas L. Ryan
ATTORNEY

F. P. BURDGE.
CULTIVATING IMPLEMENT.
APPLICATION FILED JAN. 25, 1909.
956,477.
Patented Apr. 26, 1910.
2 SHEETS—SHEET 2.
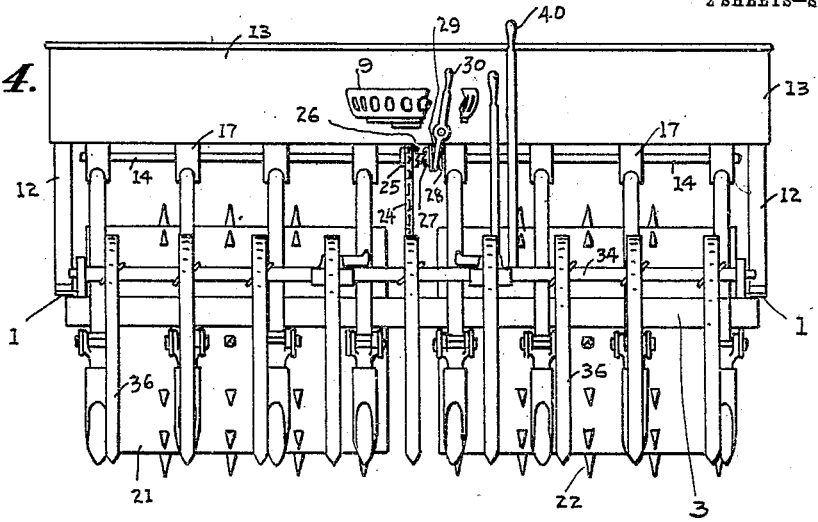
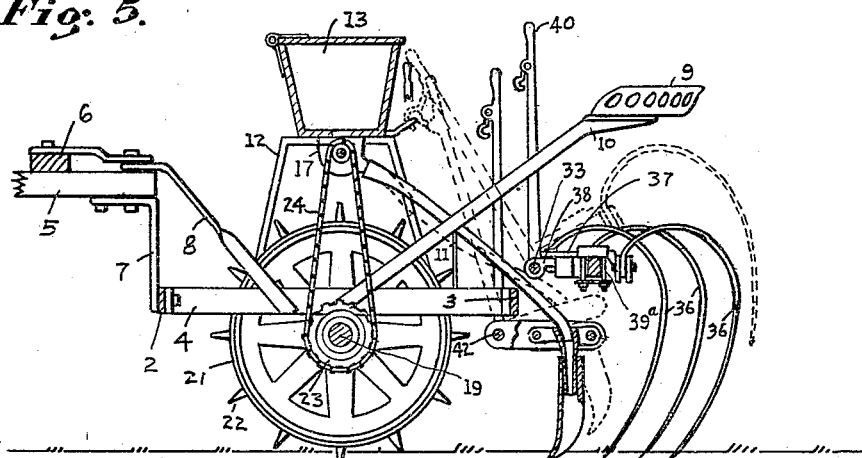
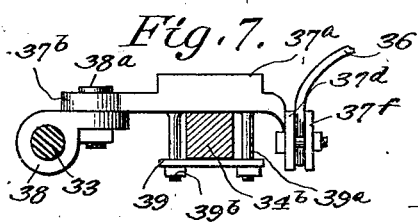
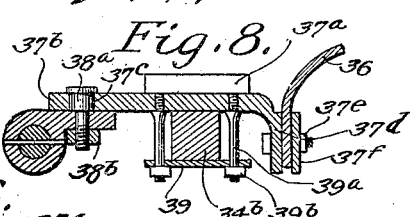
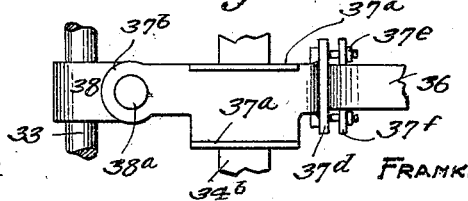
WITNESSES:
INVENTOR
FRANKLIN P. BURDGE.
BY
ATTORNEY

UNITED STATES PATENT OFFICE.

FRANKLIN P. BURDGE, OF MUNCIE, INDIANA, ASSIGNOR OF ONE-THIRD TO ADDISON E. HOPPES, OF MUNCIE, INDIANA.

CULTIVATING IMPLEMENT.

956,477.      Specification of Letters Patent.      Patented Apr. 26, 1910.

Application filed January 25, 1909. Serial No. 474,150.

*To all whom it may concern:*

Be it known that I, FRANKLIN P. BURDGE, a citizen of the United States, and a resident of Muncie, Delaware county, State of Indiana, have invented a new and useful Cultivating Implement, of which invention the following is a specification.

This invention relates to implements for rolling and preparing the soil for the planting of the seed, and for cultivating the young plants.

Objects of my present invention are to improve the construction and operation of this class of devices.

With these and other ends in view which will readily appear as the nature of my invention is better understood; the same consists in the improved construction and novel arrangement and combination of parts, which will be hereinafter fully described, and particularly pointed out in the claims.

In the accompanying drawings is illustrated a machine having the proper usual proportions, and wherein my invention is embodied.

Figure 1:
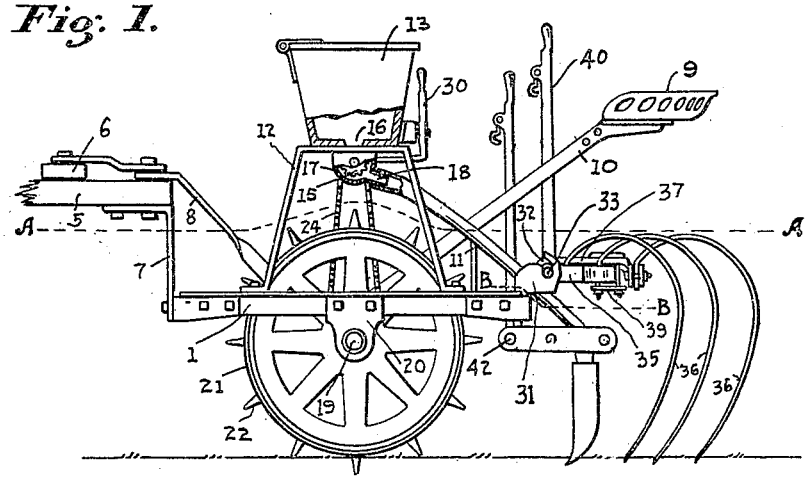
Figure 3:
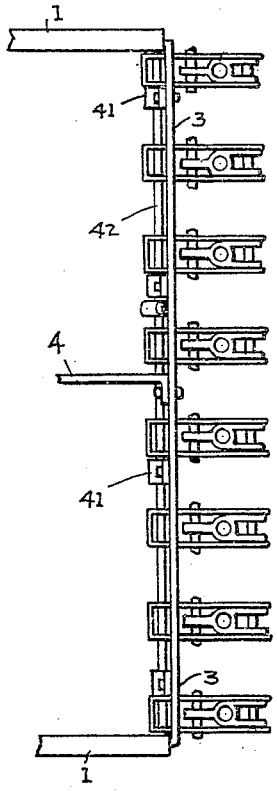
Figure 2:
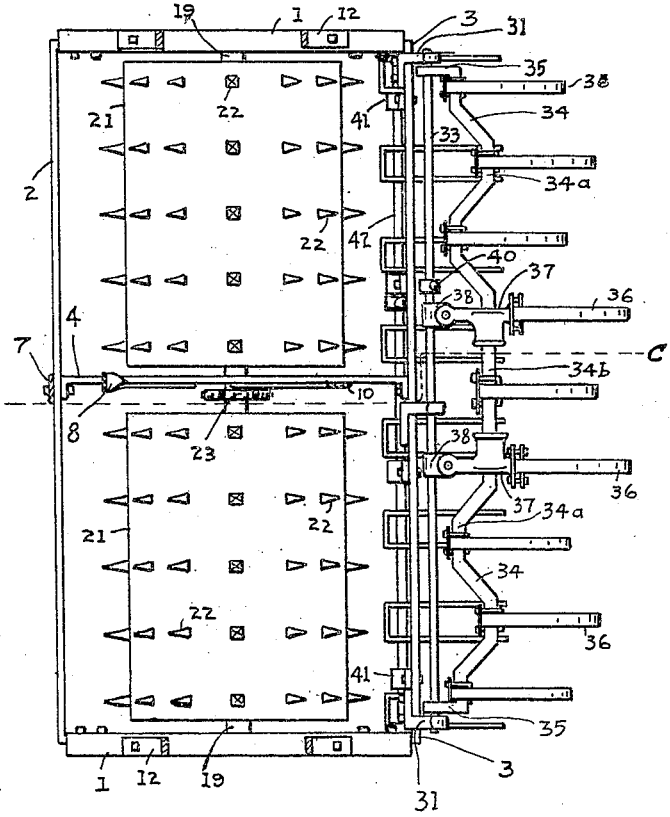

In the said drawings Figure 1 is a side view. Fig. 2 is a plan view on the line A—A Fig. 1, the drill tubes being not shown. Fig. 3 is a plan view of the rear cross-bar and its connected parts, on the line B—B Fig. 1, removed. Fig. 4 is a rear view. Fig. 5 is a longitudinal sectional view taken on the line C—C Fig. 2. Fig. 6 is a detached enlarged plan view and Fig. 7 is a side view of one of the links 37. Fig. 8 is a vertical central sectional view of Fig. 7.

Corresponding parts in the several views are indicated throughout by similar characters of reference.

The frame of my improved implement is shown of rectangular shape, the same being composed of the side members 1 and the front and rear cross-bars 2 and 3, and the central strut 4.

The suitable draft member 5 which carries the equalizer 6, is supported by the upright 7 and the brace 8, and is disposed at such height with reference to the frame that when the implement is being drawn over the ground there will be no tendency, in the drawing of same, to raise the machine, but rather the tendency of the machine will be to bear down. The importance of the position of the fixed end of this draft member with reference to the said frame and the connected parts will be apparent as the specification of my invention proceeds.

The seat 9 for the operator is positioned as shown and supported on the bar 10 that has its lower end and the brace 11 secured to the member 4, as plainly shown in Fig. 4.

The side members of the frame support a pair of arches or inverted yokes 12 carrying a seed box 13 adjacent to the bottom of which a shaft 14 is supported for rotation, said shaft being provided with corrugated rollers 15 operating adjacent to the feed openings 16 in the bottom of the seed box, said rollers being disposed within discharge spouts 17 provided in their rear sides with discharge-openings 18.

A shaft or axle 19, supported for rotation in boxings 20 that are carried by the central and side members of the frame, is equipped with a pair of spaced rollers 21, provided with clod crushing spikes 22. The said shaft 19 carries between the rollers a sprocket wheel 23 which is connected by a chain 24 with a sprocket wheel 25 which is mounted loosely on the shaft 14 and which has a clutch member 26 capable of engagement with a clutch member 27 upon a sleeve 28 which is feathered upon the shaft 14. The sleeve 28 has an annular groove 29, engaged by a bifurcated shipping lever 30 whereby it may be thrown into or out of engagement with the sprocket wheel 25, thus enabling the latter and the shaft 14 to be driven from the axle 13.

Secured to the rear cross-bar 3 of the frame are the supports 31. The mouth 32 of each of said supports extends rearwardly thence downwardly and the base of same is of suitable bore to retain loosely the shaft 33.

34 designates a bar of such zigzag shape as to have the oppositely extending portions 34$^a$ and the ends 35 of the bar are bent at substantially a right angle and are secured rigidly to the ends of the shaft 33. Upon each of the portions 34$^a$ is secured a spring-harrow tooth or cultivator-tooth 36, said teeth being thus arranged in staggered or zigzag order.

To effect the construction of an implement of the kind described which will be efficient and practicable for the cultivation of young plants, as well as for the process of cultivation generally, the arrangement and structure for the carrying and manipulation of the central teeth has been devised. The central portion 34ᵇ of the zigzag bar is straight and continuous and is adapted to have secured thereto the central tooth 36 which is easily detachable. The harrow or cultivator teeth adjacent the central tooth are carried by links 37. The body portion of this link, as plainly shown in Figs. 6, 7, and 8, is flat in cross section and will rest slidingly on the portion 34ᵇ of the zigzag bar 34. The sides of the body portion of the said link are terminated by the vertical flanges 37ᵃ, between which flanges the operator's foot may rest. The head 37ᵇ of this link has the bore 37ᶜ of diameter sufficient to afford free movement of the said head on the pin 38ᵃ which is carried by the clip that is secured to the shaft 33. The body portion of this pin 38ᵃ has the enlarged head, and the threaded shank thereof is of reduced diameter, as shown in Fig. 8 so that when the nut 38ᵇ is tightened the pin will be held securely to the clip, but will not grip the head of the link. Secured in the lower side of the link are the downwardly disposed threaded studs 39ᵃ spaced such distance apart as to afford clearance between them and the portion 34ᵇ of the zigzag bar. Carried by these studs is the clamp plate 39 which will be tightened into contact with 34ᵇ by the nuts 39ᵇ being screwed upon the studs 39ᵃ. The rear head 37ᵈ of the link is disposed downwardly and is of sufficient transverse length to retain the bolts 37ᵉ, and by which bolts and the clamp plate 37ᶠ the shank portion of the harrow tooth 36 may be held. It is only when my improved cultivating implement is to be used as a harrow or general cultivator that the links will be held immovable. When cultivation for the young plants is to be performed, the nuts 39ᵇ are unscrewed sufficiently to loosen the grip of the clamp plate 39. Then the links are free to move transversely as hereinbefore described. The feet of the operator will rest between the flanges 37ᵃ of the links and as the machine progresses, the links may be easily moved to the right or left, the harrow-teeth carried thereby will then be guided with great facility, and so effectively that there will be no injury to the small plants. By virtue of the arrangement of the shaft 33, and of the rear head 37ᵈ on a plane, below the line of the top of 34ᵇ, the natural draft or pull of the harrow tooth when in operation will cause the link to bear firmly in position, and when the link is shifted transversely there will be no wabble or angular drag of the harrow tooth. The foregoing is considered one of the essential features of my invention.

By means of the hand-lever 40 which is secured to the shaft 33 the zigzag bar and connected parts may be tilted into the inoperative position indicated by the dotted lines in Fig. 5.

Supported loosely in hangers 41 that are secured to the rear cross bar 3, is a suitable transverse shaft which serves as a support for a series of drill tubes which have the usual tubular connections with the discharge spouts from the seed box.

From the foregoing description taken in connection with the drawings the operation and advantages of my invention will be readily understood. By the crushing action of the rollers the soil will be leveled and crushed and the cultivator or harrow-teeth will serve to stir and agitate the surface of the soil and to displace weeds and grass, thus preparing the ground for the reception of seed which by the drill-tubes may be drilled into the ground.

In the operation of my improved implement when it is not desired to use the seed-drill section the hand lever is moved to and hooked into forward position, and the cultivator section left in the operative position. In general cultivation the cultivator teeth are used as shown in Fig. 2, the central tooth being in position, and the two adjacent teeth that are carried by the links 37, being secured against movement transversely, in the manner hereinbefore described.

In the cultivation of young plants it is highly desirable that the harrow or cultivator teeth shall not operate in close proximity to the plants and for this character of cultivation this implement is especially well adapted. The central tooth 36 may be entirely removed, and by having loose the links 37 the two adjacent central teeth may be freely shifted from right to left in either direction so as to define correctly the breaking line in the soil. When it is not desired to use the cultivator teeth portion, the zigzag bar and all of its connected parts may be easily detached from its operative position, by lifting it free and apart from the supports 31.

What I claim as my invention and desire to secure by Letters Patent of the United States, is—

1. In a machine of the kind described, a tool carrying bar having its ends bent at an angle, a shaft to the end portion of which are secured the ends of the tool carrying bar, harrow teeth secured to the said bar, a clip secured to said shaft at each side of the center thereof, a link loosely secured to each of said clips and having an enlarged flat portion to rest movably on the said bar, the rear end of said link being provided with a vertical face having perforations therein, substantially as described.

2. In a machine of the kind described, a tool carrying bar having its ends bent at an angle, a shaft to the end portions of which are secured the ends of the tool carrying bar, a hand lever secured to the said shaft, harrow teeth secured to the said bar, a clip secured to the said shaft at each side of the center thereof, a link loosely secured to each of said clips and having an enlarged flat portion to rest movably on the said tool carrying bar and being provided with a vertical face to which is secured a harrow tooth, the flat portion of said link having a vertical flange thereon, means carried by the links whereby they may be tightened into immovable position on the bar.

3. In a machine of the kind described, a tool carrying bar of zigzag formation but having a straight central portion, the ends of said bar being bent at an angle, a shaft to the end portions of which are secured the ends of the tool carrying bar, a hand lever secured to the said shaft, harrow teeth secured detachably to the said bar, a clip secured to the shaft at each side of the center thereof, a link loosely secured to each of said clips and having an enlarged flat portion to rest movably on the said tool carrying bar and being provided with a vertical face to which is secured a harrow tooth the flat portion of said link being vertically flanged, means carried by the links whereby they may be tightened into immovable position on the bar, a harrow tooth detachably secured at the center of the straight portion of said tool carrying bar, substantially as described.

4. In a machine of the kind described, a shaft, a tool carrying bar of zigzag formation having its ends turned at an angle and secured to the ends of the said shaft, a plurality of harrow teeth carried by said bar, a link to which is secured a harrow tooth, said link having an enlarged flat portion adapted to rest movably on the central section of the said bar, the forward end of the said link being loosely secured to the said shaft.

5. In a machine of the kind described, a shaft, a tool carrying bar of zigzag formation having its ends turned at an angle and secured to the ends of the said shaft, a plurality of harrow teeth carried by said bar, a link to which is secured a harrow tooth, said link having an enlarged flat portion adapted to rest movably on the central section of the said bar, the forward end of the said link being loosely secured to the said shaft, vertically disposed threaded studs carried by the link and disposed at opposite sides of the said tool carrying bar, a plate carried by said studs and disposed beneath and adapted to be tightened rigidly against said bar, substantially as described.

In testimony whereof I sign my name to this specification in the presence of two subscribing witnesses.

FRANKLIN P. BURDGE.

Witnesses:
ADDISON E. HOPPES,
THOMAS L. RYAN.